(12) United States Patent
Finger

(10) Patent No.: US 7,094,732 B2
(45) Date of Patent: Aug. 22, 2006

(54) DIRECT THERMAL IMAGING ON PLASTIC FILM

(75) Inventor: John Finger, Milford, OH (US)

(73) Assignee: General Data Company, Inc., Cincinnati, OH (US)

(*) Notice: Subject to any disclaimer, the term of this patent is extended or adjusted under 35 U.S.C. 154(b) by 125 days.

(21) Appl. No.: 10/678,020

(22) Filed: Oct. 2, 2003

(65) Prior Publication Data

US 2005/0281989 A1    Dec. 22, 2005

Related U.S. Application Data

(60) Provisional application No. 60/488,867, filed on Jul. 21, 2003, provisional application No. 60/479,212, filed on Jun. 17, 2003, provisional application No. 60/448,328, filed on Feb. 19, 2003, provisional application No. 60/445,983, filed on Feb. 7, 2003, provisional application No. 60/440,463, filed on Jan. 16, 2003, provisional application No. 60/416,965, filed on Oct. 8, 2002, provisional application No. 60/415,403, filed on Oct. 2, 2002.

(51) Int. Cl.
*B41M 5/40* (2006.01)

(52) U.S. Cl. ............... 503/200; 427/152; 503/226
(58) Field of Classification Search ........ 503/200–226; 427/150–152
See application file for complete search history.

(56) References Cited

U.S. PATENT DOCUMENTS

| 5,693,415 | A | | 12/1997 | Zait et al. | |
|---|---|---|---|---|---|
| 5,729,272 | A | | 3/1998 | Kikuchi | |
| 5,773,386 | A | | 6/1998 | Langan | |
| 5,798,179 | A | | 8/1998 | Kronzer | |
| 5,984,363 | A | * | 11/1999 | Dotson et al. | 283/61 |
| 6,124,236 | A | | 9/2000 | Mitchell, Jr. | |
| 6,127,313 | A | * | 10/2000 | Defieuw et al. | 503/201 |
| 6,329,318 | B1 | | 12/2001 | McFall | |
| 6,476,840 | B1 | | 11/2002 | Taylor et al. | |
| 6,479,431 | B1 | | 11/2002 | McFall et al. | |
| 6,608,002 | B1 | | 8/2003 | Mitchell, Jr. | |

* cited by examiner

*Primary Examiner*—Bruce H. Hess
(74) *Attorney, Agent, or Firm*—Frost Brown Todd LLC

(57) ABSTRACT

The present invention provides a means to produce an image in gray scale on a film using direct thermal imaging, and preferably near infrared direct thermal imaging. The present invention provides a multi-layered, laminated, non-cavitated film that has proper surface characteristics and heat transfer properties by virtue of the proper combination of polymeric layers and coatings, in particular, the active direct thermal coating, and topcoat which produce direct thermal imaging with gray scale. Such a film may be used for temporary personal identification devices, for instance, hospital wristbands and backstage passes, and may incorporate bar code data, photographs as well as other pertinent data.

10 Claims, 2 Drawing Sheets

DIRECT THERMAL IMAGING ON PLASTIC FILM

This application is based on and claims priority from U.S. Provisional Patent Application Ser. No. 60/415,403 John Finger, filed Oct. 2, 2002, U.S. Provisional Patent Application Ser. No. 60/416,965, John Finger, filed Oct. 8, 2002, U.S. Provisional Patent Application Ser. No. 60/440,463, John Finger, filed Jan. 16, 2003, U.S. Provisional Patent Application Ser. No. 60/445,983, John Finger, filed Feb. 7, 2003, U.S. Provisional Patent Application Ser. No. 60/448,328, John Finger, filed Feb. 19, 2003, U.S. Provisional Patent Application Ser. No. 60/479,212, John Finger, filed Jun. 17, 2003, and U.S. Provisional Patent Application Ser. No. 60/488,867, John Finger, filed Jul. 21, 2003.

FIELD OF INVENTION

The present invention pertains to a durable thermal coated laminated film that has the ability to have an image, for example a photograph, produced on it by means of direct thermal imaging incorporating a gray scale. The imaged film is chemical, abrasion, rub, scratch and/or temperature resistant. In particular, the present invention pertains to a non-cavitated, multi-layered laminated film which may be used for temporary personal identification devices, for instance, hospital wristbands, and may incorporate bar code data, patient photographs as well as other pertinent data.

BACKGROUND

Direct thermal imaging on paper is well known in the art. An image is formed by causing a chemical reaction on a specially coated paper that turns black when heated. In a typical direct thermal imaging process on paper, ceramic heating elements inside a print head, which are in contact with the paper, selectively turn on and off in a pattern, thereby forming the printed image (for example, alphanumeric, bar codes, or graphics). It is also possible to produce an image in gray scale with a direct thermal imaging printer. In other words, the image is composed not only of black and white, but also gray, which provides a better reproduction of the image.

In a thermal transfer printer device, the recording paper is sandwiched under pressure along with an ink sheet between a platen roller and a thermal head. The ink sheet consists of a base film coated with a heat-sublimable dye, and is disposed such that the heat-sublimable dye is pressed against the recording paper. A plurality of heating elements are provided on one side of the thermal head, and when current is sent through the thermal head these heating elements generate heat according to the printed data, and heat the heat-sublimable dye via the base film. This results in the heat-sublimable dye being sublimated and transferred onto the recording sheet.

SUMMARY OF THE INVENTION

The present invention relates to a non-cavitated, multi-layered laminate film construction and method of forming said construction and also to a method of producing an image in gray scale on the laminate using direct thermal imaging, and preferably near infrared direct thermal imaging. The laminate construction of the present invention may typically comprise the following sequence of layers: (i) a first thermoplastic film layer, having a first and a second surface wherein the thermoplastic film is selected from the group consisting of polyester, polyethylene, polypropylene, polycarbonate, and/or other known polyolefins and combinations thereof and is preferably a high density polyethylene film; (ii) an active direct thermal layer, having a first and a second surface, overlying said first surface of the thermoplastic film, said active direct thermal layer having a color developing mechanism reactive to transmissions of heat through either the first or second surface of the active direct thermal layer for forming images within the active direct thermal layer; and (iii) a radiation-curable topcoat applied to said first surface of the active direct thermal layer. The laminate may further comprise the following layers: (i) a direct thermal topcoat applied to the first surface of the active direct thermal layer of the laminate; (ii) a first acrylic adhesive layer, having a first and a second surface, that is applied to the second surface of the first thermoplastic film layer; (iii) a second thermoplastic film layer having a first and a second surface which is applied to the second surface of said first acrylic adhesive layer, where the second thermoplastic layer is preferably a polyethylene film.

Optionally, the laminate may also comprise a color print/sensor mark, a second acrylic adhesive layer, and a translucent polyolefin layer applied to the second surface of the second adhesive layer. Furthermore, the laminate may comprise one or more color coating layers applied to the first surface of the direct thermal topcoat layer.

Such a laminate film may be used for temporary personal identification devices, for instance, hospital wristbands and backstage passes, and may incorporate bar code data, photographs as well as other pertinent data.

DETAILED DESCRIPTION OF THE INVENTION

The present invention provides a means to produce an image in gray scale on a film using direct thermal imaging, and preferably near infrared direct thermal imaging. The present invention provides a multi-layered laminated non-cavitated film that has proper surface characteristics and heat transfer properties by virtue of the proper combination of polymeric layers and coatings, in particular, the direct thermal coating, thermal barrier layers and topcoat, which produce direct thermal imaging with gray scale.

Figure 1:
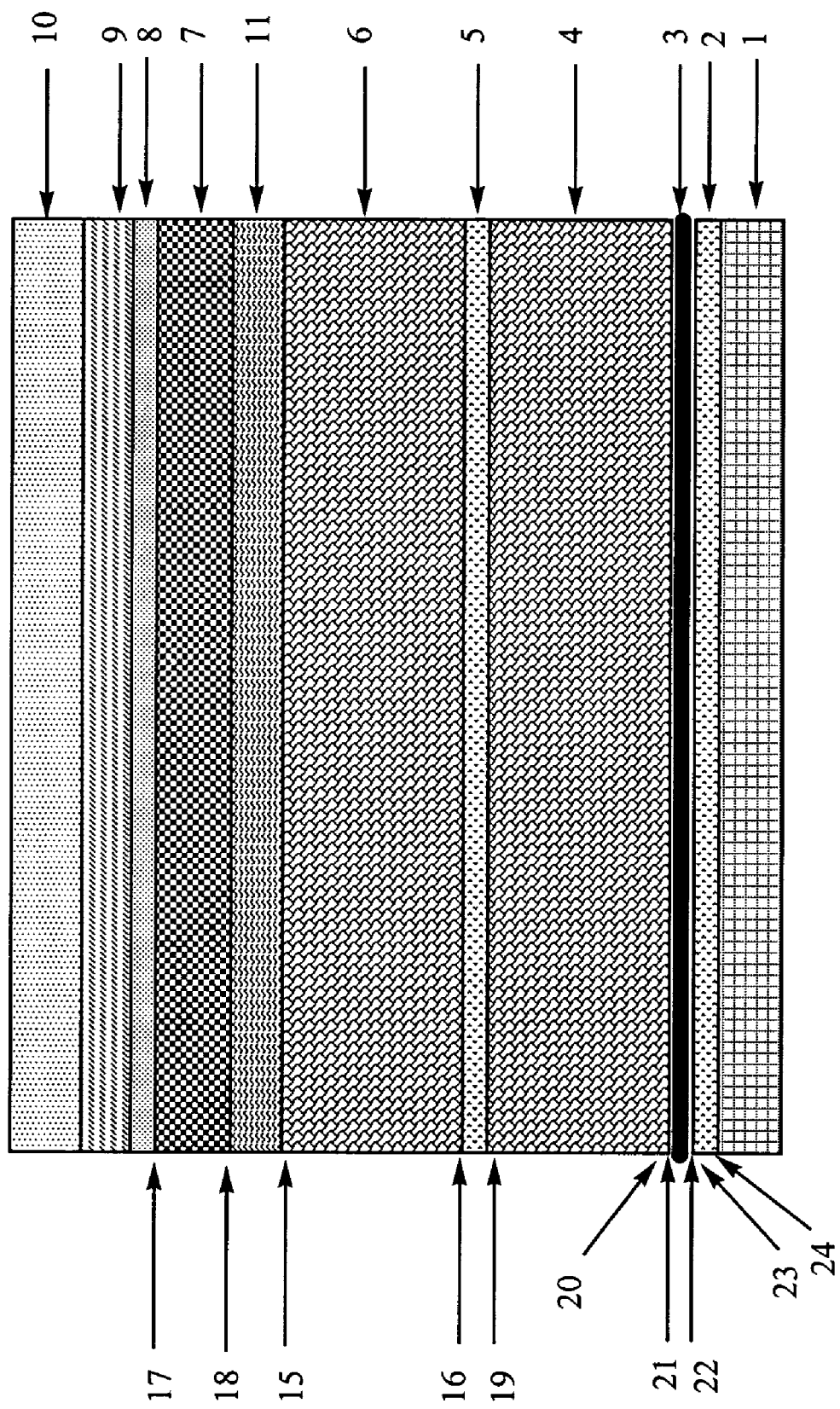
FIG. 1: multi-layered laminated wristband

A preferred embodiment of the present invention comprises the following assembly (see FIG. 1): 1) a translucent or transparent polyolefin film; 2) a second acrylic adhesive layer; 3) color print/sensor mark; 4) a second thermoplastic film layer which is noncavitated and is preferably an opaque polyolefin film, from about 2 to about 8 mil thick; 5) a first acrylic adhesive layer; 6) a first thermoplastic film layer, from about 2 to about 8 mil thick; 7) active direct thermal layer; 8) direct thermal topcoat; 9) optional color print layers as needed for the desired image; 10) radiation-curable topcoat. Optionally, a binder layer (11) may be placed between the thermoplastic film layer (layer 6) and the active direct thermal layer (layer 7).

Translucent or Transparent Polyolefin Film (1)

The translucent polyolefin film layer (1) provides protection of the printed areas that contain a colored bar for sensing the wristband "top of form" by the printer. Other information or color-coding may also be placed by the manufacture under this layer. This layer is comprised of a matte finished chemical resistant and non-absorbent high-density polyethylene that provides the appropriate contact clarity for ease of reading the imaged areas beneath the layer as well as providing comfort for the wearer. The thickness can be from about 1 to about 8 mil depending on the application requirement. This film is available from Charter Films, 1901 Winter Street, Superior, Wis. 54880.

The Adhesive (2, 5)

The adhesive (2, 5) can be any adhesive known in the art that will sufficiently bond the thermoplastic base layer to the second (and any additional) plastic layer (such as layer 4 in FIG. 1) so that these layers will not become delaminated during use in a specific application. Examples of adhesives include, but are not limited to acrylic, radiation curable, solvent or water based, pressure sensitive or laminating type adhesives.

Optionally, an adhesive 2 can be applied to the second surface of the thermoplastic film layer 6 (the layer that is not coated with the direct thermal layer 7). The plastic film may then be adhered to a release liner 27. Release liners are well known in the art. These release liners can be paper or film and contain both first and second surfaces. Typically the first surface of the liner has a silicone-coating layer. The silicone-coated surface facilitates the application of the adhesive and in the case of transfer coating, allows the release liner to be removed thus exposing the adhesive. In the case of a direct coating, the adhesive is applied to the second surface of the support material and the silicone-coated side of release liner is then laminated to the adhesive surface. The release liner provides protection to the adhesive and for further processing of the label material such as die cutting and printing. The label can be later removed from the silicone coated release liner and then be adhered to the desired surface for identification.

Color Print/Sensor Mark (3)

The layer(s) that contain pigments are designed for detection of the wristband position within the thermal printer insuring the image is correctly positioned on the wristband at the time of imaging. Typically, the "sensor" mark is printed in across the media at the beginning of the printable area. Another method for detecting the "top of form" location is through a notch or hole in the wristband that the printer detects. This type of sensing feature is provided during the die cutting process when the wristband is manufactured.

Additional Thermoplastic Layer(s) (4)

The additional thermoplastic layer(s) may also be non-cavitated and made of a material having dimensional stability, tear resistance and chemical resistance sufficient for the specific application of the imaged plastic film. The second plastic layer can be made of film or sheet comprising polyester, polyethylene, polypropylene, polycarbonate, and/or other known polyolefins. This film or sheet can be made by any process known in the art, including, but not limited to, cast sheet, cast film, extruded film or blown film. It is preferable that the second plastic layer exhibit sufficient surface smoothness to allow for imaging with gray scale. Preferably, the second plastic layer is non-cavitated and does not contain microvoids. More preferably, the second plastic layer comprises a non-cavitated polypropylene/high density polyethylene blend film. Most preferably, the second plastic layer comprises a non-cavitated polypropylene/high density polyethylene blown film available from Charter Films, 1901 Winter Street, Superior, Wis. 54880.

The Thermoplastic Film Layer (6)

The thermoplastic film layer (6) should be noncavitated and be made of a material having dimensional stability, tear resistance and chemical resistance sufficient for the specific application of the imaged plastic film. The thermoplastic film layer has first (15) and second (16) surfaces. Depending on the application for which the imaged plastic film is intended, it may need a certain degree of flexibility or other characteristics related to the feel of the material, such as surface finish. For instance, in a hospital wristband as described below, it may be desirable to use a material that is flexible so that it does not gouge into the skin of the wearer and that also has a matte finish so that it does not stick to the patient's skin. In addition, for certain applications, it may be desirable that this base layer is clear, i.e., transparent or at least translucent. The thermoplastic film layer may also be opaque. It can also include ultraviolet light inhibitors. The thermoplastic film layer may be a non-woven material, or a film or sheet comprising polyester, polyethylene, polypropylene, polycarbonate, and/or other known polyolefins and combinations thereof. This film or sheet can be made by any process known in the art, including, but not limited to, cast sheet, cast film, extruded film or blown film. Preferably, the thermoplastic film layer comprises a non-cavitated polypropylene/high density polyethylene blend film. Most preferably, the thermoplastic film layer comprises a non-cavitated high density polyethylene blown film available from Charter Films, 1901 Winter Street, Superior, Wis. 54880.

Active Direct Thermal Layer (7)

The thermal barrier and heat transfer properties of layers 4–7 and 10, respectively (FIG. 1), achieve gray scale thermal record images with selective thermal contact. The active direct thermal layer can be assembled from various systems known in the art and described in many patents, such as for example: U.S. Pat. Nos. 3,539,375; 3,674,535; 3,746,675; 4,151,748; 4,181,771; 4,246,318; and 4,470,057 which are incorporated herein by reference. In these systems, basic colorless or lightly colored chromogenic material and acidic color developer material are contained in a coating on a substrate which, when heated to a suitable temperature, melts or softens to permit said materials to react, thereby producing a colored mark. Thermally-responsive record materials have characteristic thermal response, desirably producing a colored image of sufficient intensity upon selective thermal exposure. The image is non-reversible under the action of heat and is stable in part due to the barrier properties of layers 8 and 10. In the laminate construction of the invention the active direct thermal layer is resistant to background discoloration when exposed to high heat environments in excess of 190° F.

The active direct thermal layer is basically a de-watered solid at ambient temperature. The color forming system of this invention is comprised of the electron donating dye precursors, also known as chromogenic material, in a substantially colorless state together with an acidic developer material. The color-forming reaction relies upon melting, softening, or subliming one or more of the components to achieve reactive, color-producing contact with the chromogen. Substantially colorless for purposes of the invention is understood to mean colorless or lightly or faintly colored.

The components of the active direct thermal layer are in substantially contiguous relationship, substantially homogeneously distributed throughout the coated layer or layers deposited on the substrate. For purposes of this invention the term substantially contiguous is understood to mean that the color-forming components are positioned in sufficient proximity such that upon melting, softening or subliming one or more of the components a reactive color forming contact between the components is achieved. As is readily apparent to the ordinary person skilled in this art, these reactive components accordingly can be in the same coated layer or layers, or individual components positioned in separate layers using multiple layers. In other words, one component can be positioned in the first layer and the other reactive components can be positioned in a subsequent layer or layers. All such arrangements are understood herein as being substantially contiguous.

The acidic developer to dye precursor ratio by weight is preferably maintained at from 1:1 to about 2:1. These color-forming system components are substantially insoluble in the dispersion vehicle (preferably water) and are ground to an individual particle size of less than 10 microns, preferably less than 3 microns.

The active direct thermal layer is held together by polymeric binder materials which can include both soluble and suspended polymeric agents. Examples include polyvinyl alcohol, hydroxy ethylcellulose, methylcellulose, methylhydroxypropylcellulose, starch, modified starches, gelatin, polyacrylates, styrene-butadiene-rubber latexes, polyvinylacetates, polystyrene, and the like. The polymeric binder also protects the color-forming system components from brushing and handling forces occasioned by storage and use of the thermal recording product. It should be present in an amount to afford such protection and in an amount less than will interfere with achieving reactive contact between the color-forming reactive materials.

The thermal recording layer can additionally contain pigments, such as clay, talc, silicon dioxide, aluminum hydroxide, calcined kaolin clay, calcium carbonate, and urea-formaldehyde resin. Other optional materials include natural waxes, Caranuba wax, synthetic waxes, lubricants such as zinc stearate, wetting agents, defoamers, sensitizers, UV inhibitors and antioxidants. Sensitizers typically do not impart a thermally recordable image when combined with a dye precursor, they are typically low melt point solids that act as a solvent to facilitate the commingling of the components in the color forming system. The total construction described in this invention provides heat insulating and transfer properties.

The direct thermal layer 7, when subjected to heat, provides a printed surface. The direct thermal layer is a thermally sensitive color-forming composition comprising electron donating dye precursor (chromogenic material) and acidic developer material. The recording media according to the invention has a non-reversible image in that under normal use conditions when a record or image is created, it is substantially non-reversible and stable for many months or even years. The color-forming composition (or system) of the recording media of this invention comprises chromogenic material (electron-donating dye precursor) in its substantially colorless state, and acidic developer material. The color-forming system of the direct thermal layer relies upon melting, softening, or subliming one or more of the components to achieve reactive, color-producing contact. The direct thermal layer can be imaged using a direct thermal printer. The direct thermal layer can be selected for a particular application. For example, chemical resistant durable labels for use in laboratory slides that will be subjected to heat during use may require a thermal coating with a higher initial activation temperature. In the case of high-speed sortation, thermal layer providing a higher print contrast ratio of light to dark allow improved readability of the printed image. Preferably, the direct thermal layer applied to a substrate is supplied by Appleton, 825 E. Wisconsin Ave., P.O. Box 359, Appleton, Wis. 54912-0359. Near-infrared chromogens can be optionally incorporated to enhance readability of imaged characters by optical or near infrared scanners.

The coating can optionally be applied to all of the substrate or spot printed on a certain portion. All such arrangements are understood herein as being substantially contiguous and would be readily apparent to the skilled artisan.

In manufacturing the direct thermal layer, a coating composition is prepared which includes a fine dispersion of the components of the color-forming system, polymeric binder material, surface active agents and other additives in an aqueous coating medium. The color-forming composition can additionally contain inert pigments, such as clay, talc, aluminum hydroxide, calcined kaolin clay and calcium carbonate; synthetic pigments, such as urea-formaldehyde resin pigments; natural waxes such as Carnuba wax; synthetic waxes; lubricants such as a zinc stearate; wetting agents; defoamers, UV stabilizers, and antioxidants. Sensitizers can also be optionally included. Sensitizers for example, can include acetoacet-o-toluidine, phenyl-1-hydroxy-2-naphthoate, 1,2-diphenoxyethane, or p-benzylbiphenyl or mixtures thereof. The sensitizer or modifier typically does not impart significant imaging on its own, but as a relatively low melt point solid, acts as a solvent to facilitate reaction between the components of the color-forming system.

The color-forming system components are substantially insoluble in the dispersion vehicle (preferably water) and are ground to an individual average particle size of between about 1 micron to about 10 microns, preferably about 1–3 microns. The polymeric binder material is substantially vehicle soluble although latexes are also eligible in some instances. Preferred water soluble binders include polyvinyl alcohol, hydroxy ethyl-cellulose, methylcellulose, methylhydroxypropylcellulose, starch, modified starches, gelatin and the like. Eligible latex materials include polyacrylates, sytrene-butadiene-rubber latexes, polyvinylacetates, polystyrene, and the like. The binder serves as an adherent and protects the thermal layer from brushing and handling forces occasioned by storage and use. Binder should be present in an amount to afford protection and in an amount less than will interfere with achieving reactive contract between color-forming reactive materials.

Coating weights can effectively be about 3 to about 9 grams per square meter (gsm) and preferably about 5 to about 6 gsm. The practical amount of color-forming materials is controlled by economic considerations, functional parameters and desired handling characteristics.

Eligible electron-donating dye precursors are chromogenic material. Chromogenic materials such as the phthalide, leucauramine and fluoran compounds, for use in the color-forming system are well known color-forming compounds. Examples of the compounds include Crystal Violet Lactone (3,3-bis(4-dimethylaminophenyl)-6-dimethylaminophthalide, U.S. Pat. No. RE 23,024); phenyl-, indol-, pyrrol-, and carbazol-substituted phthalides (for example, in U.S. Pat. Nos. 3,491,111; 3,491,112; 3,491,116; 3,509,174); nitro-, amino-, amido-, sulfon amido-, aminobenzylidene-, halo-, anilino-substituted fluorans (for example, the U.S. Pat. Nos. 3,624,107; 3,627,787; 3,641,011; 3,642,828; 3,681,390); spirodipyrans (U.S. Pat. No. 3,971,808); and pyridine and pyrazine compounds (for example, in U.S. Pat. Nos. 3,775, 424 and 3,853,869). Other specifically eligible chromogenic compounds, not limiting the invention in any way, are:

3-diethylamino-6-methyl-7-anilino-flouran (U.S. Pat. No. 4,510,513) also known as 3-dibutylamino-6-methyl-7-anilino-fluoran; 3-dibutylamino-7-(2-chloroanilino) fluoran; 3-(N-ethyl-N-tetrahydrofurfurylamino)-6-methyl-7-3,5'6-tris(dimethylamino)spiro[9H-fluorene-9,1'(3'H)-isobenzofuran]-3'-one; 7-(1-ethyl-2-methylindol-3-yl)-7-(2-chloroanilino) fluoran (U.S. Pat. No. 3,920,510); 3-(N-methylcyclohexylamino)-6-methyl-7-anilinofluoran (U.S. Pat. No. 3,959,571); 7-(1-octyl-2-methylindol-3-yl)-7-(4-diethylamino-2-ethoxyphenyl)-5,7-dihydrofuro[3,4-b]pyridin-5-one; 3-diethylamino-7,8-benzofluoran; 3,3-bis(1-ethyl-2-methylindol-3-yl)phthalide; 3-diethylamino-7-anilinofluoran; 3-diethylamino-7-benzylaminofluoran; 3'-phenyl-7-dibenzylamino-2,2'-spirodi-[2-H-1-benzopyran] and mixtures of any of the above.

Other known developer materials may also be included provided not used in an amount so as to detract from the functionality of the combination of the invention. Other acidic developer material include the compounds listed in U.S. Pat. No. 3,539,375 as phenolic reactive material, particularly the monophenols and diphenols. Acidic developer material also include, the following compounds: 4,4'-isopropylidinediphenol (Bisphenol A); p-hydroxybenzaldehyde; p-hydroxybenzophenone; p-hydroxypropiophenone; 2,4-dihydroxybenzophenone; 1,1-bis(4-hydroxyphenyl)cyclohexane; salicyanilide; 4-hydroxy-2-methylacetophenone; 2-acetylbenzoic acid; m-hydroxyacetanilide; p-hydroxyacetanilide; 2,4-dihydroxyacetophenone; 4-hydroxy-4'-methylbenzophenone; 4,4'-dihydroxybenzophenone; 2,2-bis(4-hydroxyphenyl)-4-methylpentane; benzyl 4-hydroxyphenyl ketone; 2,2-bis(4-hydroxyphenyl)-5-methylhexane; ethyl-4,4-bis(4-hydroxyphenyl)-pentanoate; isopropyl-4,4-bis (4-hydroxyphenyl)pentanoate; methyl-4,4-bis(4-hydroxyphenyl) pentanoate; alkyl-4,4-bis(4-hydroxyphenyl) pentanoate; 3,3-bis (4-hydroxyphenyl)(-pentane; 4,4-bis (4-hydroxyphenyl)-heptane; 2,2-bis(4-hydroxypheyl)-1-phenylpropane; 2,2-bis(4-hydroxyphenyl)butane; 2,2'-methylene-bis(4-ethyl-6-tertiarybutyl phenol); 4-hydroxycoumarin; 7-hydroxy-4-methylcoumarin; 2,2'-methylene-bis(4-octyl phenol); 4,4'-sulfonyldiphenol; 4,4'-thiobis(6-tertiarybutyl-m-cresol); methyl-p-hydroxybenzoate; n-propyl-p-hydroxybenzoate; and benzyl-p-hydroxybenzoate.

Examples of other developer compounds include phenolic novolak resins which are the product of reaction between, for example, formaldehyde and a phenol such as an alkylphenol, e.g., p-octylphenol, or other phenols such as p-phenylphenol, and the like; and acid mineral materials including colloidal silica, kaolin, bentonite, aftapulgite, hallosyte, and the like. Some of the polymers and minerals do not melt but undergo color reaction on fusion of the chromogen.

Example of Direct Thermal Layer:

Ten grams of 2-anilino-3-methyl-6-dibutylamino fluoran are dispersed for 2 hours by means of a media mill together with 14 grams of 13% aqueous polyvinyl alcohol. Twenty grams of 4-hydroxy-4'-isopropoxysulfone are dispersed for 2 hours by means of a media mill together with 24 grams of a 9.5% solution of polyvinyl alcohol. Optionally 10 grams of 1,2-diphenoxy ethane are dispersed for 2 hours by means of a media mill together with 13 grams of a 11% solution of polyvinyl alcohol. The dispersions can be mixed together and a binder of styrene-butadiene latex and polyvinyl alcohol added. The coating is applied to a substrate such that the amount of coating is around 3 grams per square meter. The coating is dried and an optional top coat also applied. The second coating can be optionally calendared.

Direct Thermal Topcoat Layer (8)

Optionally, the active direct thermal layer can be topcoated (8). This layer provides a barrier that prevents contaminants from contacting the active direct thermal layer or slows their penetration. It also protects the color-forming system components from brushing and handling forces occasioned by storage and use of the thermal recording product. It provides a unique tie layer between the active direct thermal layer (7) and the topcoat (10) with good interfacial adhesion. Finally, it provides a suitable surface for printing. Optionally, the thermally-sensitive color-forming composition can be overcoated with a protective layer top coat or barrier layer formed from one or more water soluble or dispersible polymeric materials such as polyvinyl alcohol, carboxylated polyvinyl alcohol, methyl or ethyl cellulose, polyacrylamide, gelatin, starch or polyvinyl pyrrolidone. Lubricants, antioxidants, UV inhibitors, waxes and other materials to improve physical handling and shelf stability properties can also be optionally included.

Direct thermal topcoat layers are well known in the art. They consist of pigments, binder, and crosslinker substantially homogeneously distributed throughout the coated layer or layers. The ratios of the materials can be varied depending on the balance of barrier and printing properties needed. Most of the needs can be covered by varying the pigment from 0–80 dry wt %, the binder from 10–90 dry wt %, and the crosslinker from 0–30 dry wt %. The pigments can include clay, talc, silicon dioxide, aluminum hydroxide, calcined kaolin clay, calcium carbonate, and urea-formaldehyde resin. Examples of the binders include polyvinyl alcohol, hydroxy ethylcellulose, methylcellulose, methylhydroxypropylcellulose, starch, modified starches, gelatin, polyacrylates, styrene-butadiene-rubber latexes, polyvinylacetates, polystyrene, and the like.

Color Print Layers (9)

Color printed layer(s) 9 on viewable side of the direct thermal layer can provide additional static information such as name and/or logo of the institution providing the service. A particular color may denote a specific condition of the wearer, i.e. contagious, is restricted to a certain area, etc. One or more colors can be added at the time of manufacture depending on the requirements.

The Topcoat Layer (10)

The topcoat layer is a required layer and it provides chemical and/or abrasion resistance. It assists in the heat transfer from the heating element in the printer head to the direct thermal coating. The topcoat can be applied by any method known in the art (flexography, screen-printing, offset, gravure, Meyer rod). Preferably, it is radiation curable, and more preferably, ultraviolet light curable. The topcoat layer can comprise a cross-linkable clear coat. More preferably, the topcoat layer is a barrier topcoat developed by Northwest Coating, 7221 S.10$^{th}$ Street, Oak Creek Wis. 53154, or Water Ink Technologies, 6001 Harris Technology Blvd., Charlotte, N.C. 29269.

Binder Layer (11)

The polymeric binder material 11 is optional and is substantially vehicle soluble although latexes are also eligible in some instances. Preferred water soluble binders include polyvinyl alcohol, hydroxy ethyl-cellulose, methylcellulose, methyl-hydroxypropylcellulose, starch, modified starches, gelatin and the like. Eligible latex materials include polyacrylates, sytrene-butadiene-rubber latexes, polyvinylacetates, polystyrene, and the like. The binder serves as an adherent and protects the thermal layer from brushing and handling forces occasioned by storage and use. Binder should be present in an amount to afford protection and in an amount less than will interfere with achieving reactive contract between color-forming reactive materials.

EXAMPLES

Wristband

An identification band, tag or label can be produced using the present invention.

Because the present invention provides the ability to produce a clear image with gray scale, photographs can be reproduced fairly easily as a means for temporary identification. For example, hospital wristbands that include the photograph of a patient can be produced. This would provide hospitals with the ability to place a wristband with a photograph of the mother on a newly born infant, while mother and child are still in the delivery room. In addition, patient records can be read from a two-dimensional bar code that can be reproduced on a wristband made with the present invention. The present invention, with its laminated structure, allows a base layer to be chosen for the plastic film that will be more comfortable to wear, in part because it is flexible and has a matte surface finish. It also provides excellent tear resistance and superior tensile strength. Because it can be imaged with a standard direct thermal printer (or with a thermal transfer printer set to operate in a direct thermal mode), a wristband made using the present invention can easily be printed at the time the patient is admitted. The imaged plastic film is alcohol, water and stain resistant. Other uses of identification tags include laminated back stage passes that are imaged with the photograph of the authorized user.

An examples of a plastic film suitable for use as hospital identification wristbands has the following construction (see FIG. 1):

| | |
|---|---|
| Topcoat: | Chemical Resistant Over Print Varnish-from Northwest Coatings |
| Direct Thermal Layer: | Direct Thermal Near Infrared Coating |
| Second Plastic Layer: | 7.35 mil Noncavitated Polyolefin Blend, 80/20 polypropylene/polyethylene |
| Adhesive: | Press Applied Adhesive |
| Thermoplastic Base Layer: | 1.5 mil Matte Clear High Density Polyethylene |

Clear Plastic Film for Temporary Identification Tags or Labels

Figure 2:
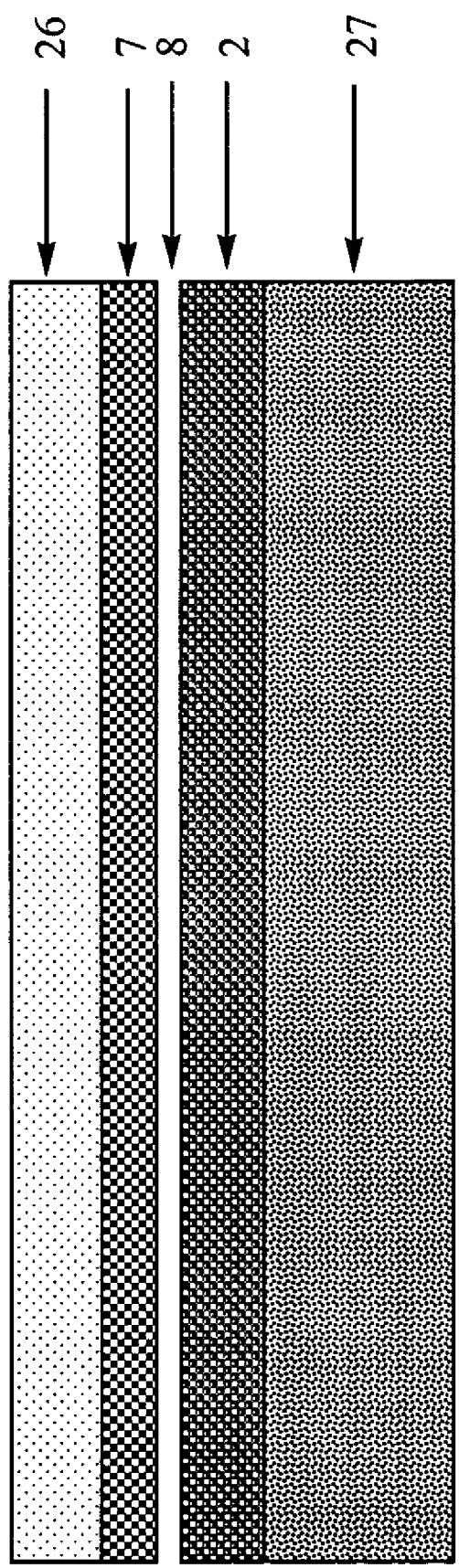
FIG. 2: multi-layered laminated clear plastic film.

In an embodiment (see FIG. 2) of the present invention, the film comprises a single plastic layer, a direct thermal coating and a topcoat. The single plastic layer can have the characteristics of either the base layer or second plastic layer described above, that being non-cavitated, clear, and with a thickness of 0.4 to 2 mil. The direct thermal coating and the overcoat are the same as described above.

In addition, the use of a clear thermoplastic base layer 26, which is thin enough to let the heat from the printer head radiate through, allowing the plastic film to be imaged through the thermoplastic layer side (i.e., underside) of the material. Accordingly, the print head contacts the plastic layer, rather than the topcoat. This construction provides additional protection to the image. It can also eliminate the need for a topcoat. This construction can also provide greater ultraviolet light resistance than is presently available, particularly if the thermoplastic base layer includes ultraviolet light inhibitors. It can provide both direct thermal and ultraviolet fade resistance properties. For example, for applications where the plastic film will be used outdoors, if an ultraviolet light inhibitor that prevents transmission of about 98% of the ultraviolet light is used, the useful life of that plastic film could be extended from about six months to about five years.

When a clear plastic layer 26 is combined with a clear direct thermal layer 7, the resulting clear plastic film can be applied to a pre-existing label or surface that has color, graphics, and/or printing that will show through the imaged plastic film.

The use of a clear plastic layer 26, which is clear enough to view the image through the plastic layer side of the material. The print head contacts the plastic layer, rather than the overcoat. The thermal printer activates the thermal layer through the plastic film. This construction provides additional protection to the image. It can also eliminate the need for an overcoat. This construction can provide greater ultraviolet light resistance than is presently available, particularly if the plastic layer includes ultraviolet light inhibitors. It can provide direct thermal and ultraviolet fade resistance properties.

An example of a clear plastic film for temporary identification purposes can have the following construction (see FIG. 2):

| | |
|---|---|
| Clear plastic film: | may include ultraviolet light inhibitors 0.5 mil clear plastic layer, noncavitated |
| Active Direct Thermal Coating | |
| Direct Thermal Top Coat Layer | |
| Adhesive Layer | |
| Release Liner | |

What is claimed is:

1. A laminate construction, able to provide a non-reversible image in gray scale, imaged by means of applying concentrations of heat to said laminate construction, where said laminate construction comprises the following sequence of layers:
    a) a first non-cavitated thermoplastic film layer, having a first and a second surface wherein the thermoplastic film is selected from the group consisting of polyester, polyethylene, polypropylene, polycarbonate, and/or other known polvolefins and combinations thereof;
    b) an active direct thermal layer, having a first and a second surface, overlying said first surface of the thermoplastic film, said active direct thermal layer having a non-reversible color developing mechanism reactive to transmissions of heat through either the first or second surface of the active direct thermal layer for forming images within the active direct thermal layer;
    c) a radiation-curable topcoat applied to said first surface of the active direct thermal layer;
    d) an acrylic adhesive layer having a first and a second surface, wherein the first surface of the adhesive is applied to the second surface of the first non-cavitated thermoplastic film layer;
    e) a second non-cavitated thermoplastic film layer having a first and a second surface and is applied to the second surface of said acrylic adhesive layer;
    f) a direct thermal topcoat applied to the first surface of the active direct thermal layer of the laminate;
    g) a color print/sensor mark, having a first and second surface, applied to the second surface of the second thermoplastic film layer;

h) an additional acrylic adhesive layer, having a first and second surface, applied to the second surface of the colorprint/sensor mark; and i) a translucent polyolefin layer applied to the second surface of the second adhesive layer.

2. The laminate construction of claim 1 wherein the laminate further comprises one or more color coating layers applied to the first surface of the direct thermal topcoat layer.

3. The laminate construction of claim 2 wherein the first thermoplastic layer is a high density polyethylene film.

4. The laminate construction of claim 3 wherein the second thermoplastic layer is a high density polyethylene film.

5. A laminated wristband able to be direct thermally imaged with a non-reversible image in gray scale, which comprises the following sequence of layers:

a) a cross-linkable radiation-curable clear topcoat;
b) a color print layer;
c) a direct thermal topcoat layer;
d) an active direct thermal layer, said active direct thermal layer having a color developing mechanism reactive to transmissions of heat through either the first or second surface of the active direct thermal layer for forming images within the active direct thermal layer;
e) a first thermoplastic film layer comprising a non-cavitated high density polyethylene film;
f) a first acrylic adhesive layer;
g) a second thermoplastic layer comprising a non-cavitated polypropylene/high density polyethylene film;
h) a color print/sensor mark;
i) a second acrylic adhesive layer; and
j) a translucent polyolefin layer.

6. The wristband of claim 5 wherein a binder layer is inserted between the first thermoplastic film layer and the active direct thermal layer.

7. The wristband of claim 5, wherein said wristband is used for temporary identification purposes.

8. The wristband of claim 7 wherein said wristband contains a photograph directly printed on the wristband as well as other pertinent data.

9. A process for forming a gray scale, non-reversible, thermally imaged multi-layered laminated wristband comprising:

a) forming a first construction by coating a first surface of a non-cavitated thermoplastic film layer with an active direct thermal layer and applying to a first surface of the active direct thermal layer a direct thermal top coat;
b) forming a second construction by applying a radiation-curable topcoat layer to a color printed layer;
c) forming a third construction by applying an acrylic adhesive layer to a first surface of a second thermoplastic film layer and applying a colorprint/sensor mark to a second surface of the second thermoplastic film layer;
d) forming a fourth construction by applying an acrylic adhesive layer to a translucent polyolefin layer;
e) forming a first intermediate by adhering the direct thermal top coat layer of said first construction to the color printed layer of said second construction;
f) forming a second intermediate by adhering the color print sensor mark of said third construction to the acrylic adhesive layer of said fourth construction;
g) forming said laminated wristband by adhering the thermoplastic layer of said first intermediate to the acrylic adhesive layer of said second intermediate.

10. A laminated wristband, able to be thermally imaged, comprising the following sequence of layers:

a) a first non-cavitated thermoplastic film layer, having a first and a second surface wherein the thermoplastic film is an opaque high density polyethylene film;
b) an active direct thermal layer, having a first and a second surface, overlying said first surface of the thermoplastic film, said active direct thermal layer having a color developing mechanism reactive to transmissions of heat through either the first or second surface of the active direct thermal layer for forming images within the active direct thermal layer, and said active direct thermal layer also having a direct thermal topcoat, applied to the first surface of the active direct thermal layer;
c) one or more color coating layers, having a first and second surface, applied to the first surface of the active direct thermal topcoat layer;
d) a radiation-curable topcoat applied to the first surface of the color coating layers;
e) a first acrylic adhesive layer, having a first and second surface, that is applied to the second surface of the first thermoplastic film layer;
f) a second non-cavitated, opaque high density polyethylene thermoplastic film layer having a first and a second surface and is applied to the second surface of said first acrylic adhesive layer;
g) a color print/sensor mark layer, having a first and a second surface, applied to the second surface of the second thermoplastic film layer;
h) a second acrylic adhesive layer, having a first and second surface, applied to the second surface of the colorprint/sensor mark layer; and
i) a translucent polyolefin layer applied to the second surface of the second acrylic adhesive layer.

* * * * *